United States Patent [19]
Herrell

[11] 3,784,854
[45] Jan. 8, 1974

[54] BINARY ADDER USING JOSEPHSON DEVICES

[75] Inventor: Dennis J. Herrell, Somers, N.Y.

[73] Assignee: International Business Machines Corporation, Armonk, N.Y.

[22] Filed: Dec. 29, 1972

[21] Appl. No.: 319,812

[52] U.S. Cl. .................. 307/212, 307/216, 307/245, 307/306, 317/234 T
[51] Int. Cl. .................. H03k 17/80, H03k 19/10
[58] Field of Search .................. 307/212, 245, 277, 307/306, 216

[56] References Cited

UNITED STATES PATENTS

| | | | |
|---|---|---|---|
| 3,370,210 | 2/1968 | Fiske | 307/306 X |
| 3,196,408 | 7/1965 | Brennemann et al. | 307/306 X |
| 3,363,211 | 1/1968 | Lambe et al. | 307/306 X |
| 3,363,200 | 1/1968 | Jaklevic et al. | 307/306 X |
| 3,267,268 | 8/1966 | Sanborn | 307/212 X |
| 3,264,490 | 8/1966 | Gange | 307/212 |
| 3,430,064 | 2/1969 | Meng | 307/216 X |
| 3,275,813 | 9/1966 | Brastins | 307/216 X |

OTHER PUBLICATIONS

Sanborn, IBM Tech. Discl. Bull. Vol. 3, No. 8, Jan. 1961, pages 57–58.

Sanborn, IBM Tech. Discl. Bull., Vol. 3, No. 11, April 1961, pages 52–53.

*Primary Examiner*—John W. Huckert
*Assistant Examiner*—William D. Larkin
*Attorney*—Richard C. Sughrue et al.

[57] ABSTRACT

A binary adder using Josephson devices for the sum and carry gates is disclosed. A gating current $I_{g1}$ is applied to a Josephson device operating as a sum gate, and a gating current $I_{g2}$ is applied to a Josephson device operating as a carry gate. Each of said Josephson devices switches from $v = 0$ to $v \neq 0$ when the control current applied thereto lowers the critical gating current below the applied gating currents $I_{g1}$ and $I_{g2}$ respectively. The binary bits to be added, A, B, and Carry, C, from the prior stage, are applied to the Josephson devices as control currents $I_x$. The sum gate switches to $v \neq 0$, corresponding to a sum bit output, S, when the total control current is $I_x$ or $3I_x$. The carry gate switches to $v \neq 0$, corresponding to a carry bit output, C, when the total control current is $2I_x$ or $3I_x$.

9 Claims, 13 Drawing Figures

BINARY ADDER USING JOSEPHSON DEVICES

BACKGROUND OF THE INVENTION

The invention is in the field of binary adders and more particularly is a binary adder using Josephson devices to perform sum and carry gating operations.

A binary adder for adding binary bits A and B generates a sum, S, and Carry, C, bits in accordance with the logic relations:

$$S = \bar{A} \cdot B + A \cdot \bar{B}$$

$$C = A \cdot B$$

A parallel binary adder includes multiple stages. The first stage performs the logic functions given above. However, all other stages receive three binary bit inputs. For example, stage 2 receives input binary bits $A_2$ and $B_2$ as well as the carry bit $C_1$ generated by the first adder stage. The second stage provides outputs $S_2$ and $C_2$ in accordance with the logic relations:

$$S_2 = A_2 \cdot B_2 \cdot C_1 + A_2 \cdot \bar{B}_2 \cdot \bar{C}_1 + \bar{A}_2 \cdot B_2 \cdot \bar{C}_1 + \bar{A}_2 \cdot \bar{B}_2 \cdot C_1$$

$$C_2 = A_2 \cdot B_2 \cdot C_1 + \bar{A}_2 \cdot B_2 \cdot C_1 + A_2 \cdot \bar{B}_2 \cdot C_1 + A_2 \cdot B_2 \cdot \bar{C}_1$$

A truth table for the addition logic is shown in the table below:

| $A_n$ | $B_n$ | $C_{n-1}$ | $S_n$ | $C_n$ |
|---|---|---|---|---|
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 1 | 1 | 0 | 0 | 1 |
| 0 | 1 | 1 | 0 | 1 |
| 1 | 0 | 1 | 0 | 1 |
| 1 | 1 | 1 | 1 | 1 |

Standard logic for an adder stage comprises a combination of logic gates (AND, OR, or NOR) for the sum function and a combination of logic gates for the carry function. Each logic gate also typically comprises a plurality of active elements, e.g., diodes or transistors.

Devices which exhibit the Josephson effect are known and such devices have been disclosed as being useful for switching functions. Such devices are cryogenic and have an I-V characteristic which allows them to perform switching functions. The voltage across a device is $v = 0$ for gating currents up to $I_m$, the critical current. At $I_m$ the voltage jumps to $v = 2\Delta \neq 0$, where $\Delta$ is the superconducting energy gap. Furthermore, the critical current varies with magnetic field applied to the Josephson device. The magnetic field is typically applied by means of a control current flowing through a control line overlapping the Josephson device. The critical current, $I_m$, versus the control current, $I_c$, is known as the gain curve of the device. A Josephson device can be made to switch from the $V = 0$ to the $V = 2\Delta$ state by varying the control current $I_c$. For example, if a control current of $I_{c1}$ and a gate current of $I_{g1}$ are applied, and if $I_{c1}$ causes $I_{m1}$ to be above $I_{g1}$, the device will be in the $V = 0$ state. If the control current is changed to $I_{c2}$, which causes $I_{m2}$ to be less than $I_{g1}$, and $I_{g1}$ is again applied as the gate current, the device will switch to $V = 2\Delta$ state.

SUMMARY OF THE INVENTION

In accordance with the present invention a binary adder is provided with a single Josephson device performing the carry gating function and another single Josephson device performing the sum gating function. The input bits A, B and C are applied as equal valued control currents by current carrying lines overlaying and insulated from the Josephson devices. The carry gate and the gating current $I_{g2}$ are selected to provide a gain curve which exceeds $I_{g2}$ if none or one of the input lines carries a control current and which is below $I_{g2}$ if any two or three input lines carries control current. Thus, the carry gate switched to $v = 2\Delta$ for the logic combination of inputs necessary to generate a carry output.

The sum gate and the gating current $I_{g1}$ are selected to provide a gain curve which exceeds $I_{g1}$ if none or two input lines have control current flowing therethrough and which is below $I_{g1}$ if one or three input lines have control current flowing therethrough. Thus, the sum gate switched to $v = 2\Delta$ for the logic combination of inputs necessary to generate a sum output.

DETAILED DESCRIPTION

Figures 1, 2, 3, 4:
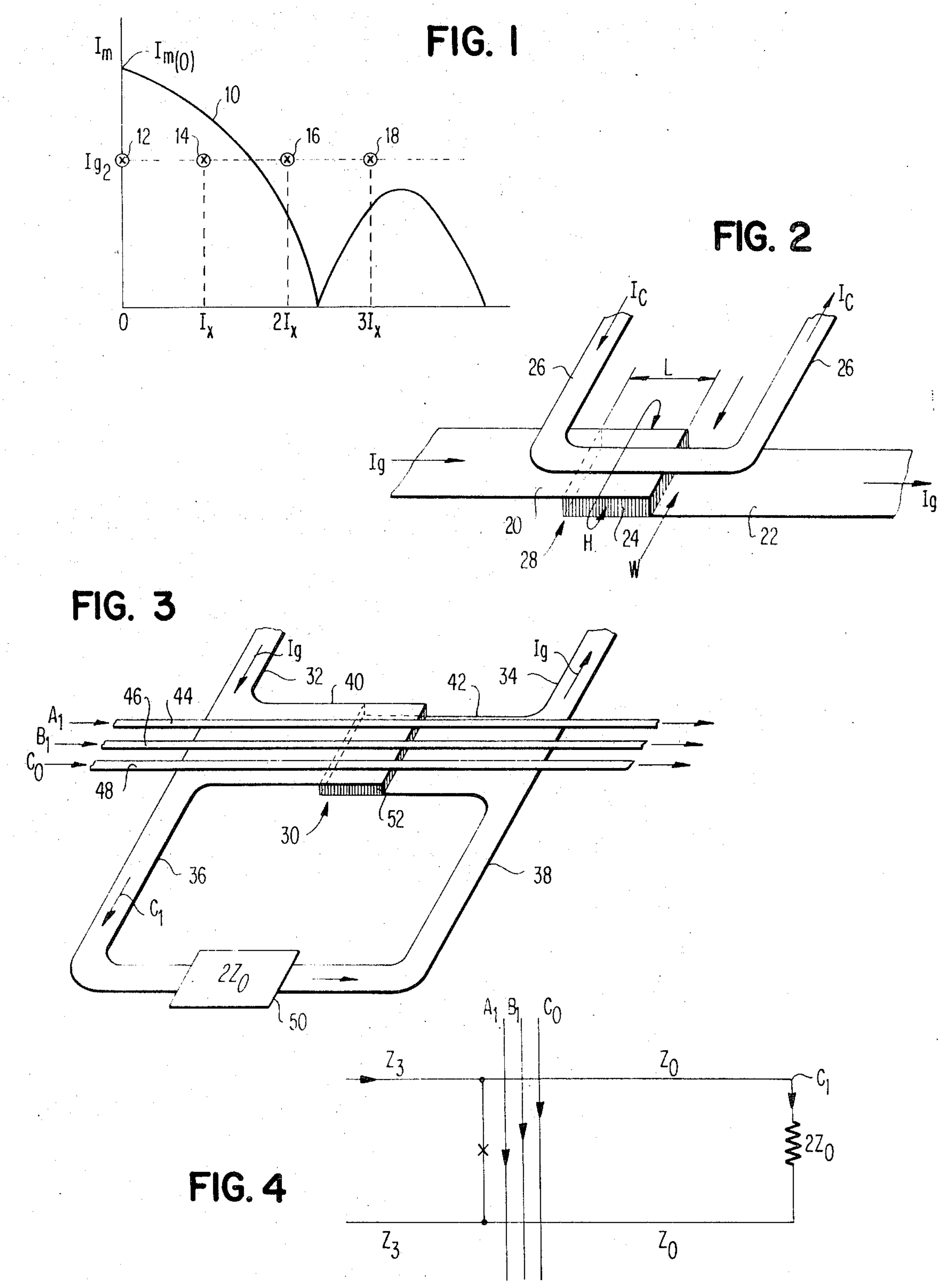
FIG. 1 is a graph of a gain curve for a Josephson device suitable for performing the carry function of a binary adder.
FIG. 2 is an oblique view of a rectangular Josephson junction.
FIG. 3 is an oblique view of a carry gate comprising a rectangular Josephson junction.
FIG. 4 is a schematic of FIG. 3.

The carry gate for a stage of the binary adder comprises a Josephson device having a gain curve of the type shown in FIG. 1. The gain curve 10 represents a plot of the critical current, on the $y$-axis, versus the magnetic field or control current, on the $x$-axis. Assuming a Josephson device having a gain curve as illustrated it can be seen that a gating current $I_{g2}$ will provide carry function if the input lines carry currents of 0 or $I_x$ corresponding to binary 0 and binary 1 respectively.

If all of the inputs are binary 0 the gate current $I_{g2}$ as seen at point 12 is below the critical current and the Josephson device will be in the $v = 0$ state. The same is true when one of the inputs is a binary 1 as seen at point 14. However, as shown by points 16 and 18, if two or three inputs are binary 1, resulting in total control currents $2I_x$ and $3I_x$ respectively, the gate current $I_{g2}$ will be above the gain curve and the Josephson device will switch to $v=2\Delta$, corresponding to a binary 1 carry output.

Although there are a number of Josephson devices which would provide gain curves of the type shown in FIG. 1, one particular Josephson device having the desired gain curve is a rectangular shaped Josephson junction illustrated in FIG. 2. As is well known, a Josephson junction comprises a pair of superconductors 20 and 22 separated by a tunnelling oxide 24. The magnetic field H for determining the critical gate current is generated by control current $I_c$ applied to a superconducting path 26 which overlaps and is insulated from the junction 28. A gating current $I_g$ is applied to the junction 28 via superconductors 20 and 22.

The gain curve 10 (FIG. 1) of a linear in-line rectangular Josephson junction is given by:

$$I(x) \alpha \mid \sin x/x \mid,$$

where $x$ represents the magnetic field applied to the junction. Since the magnetic field is proportional to the control current, the gain curve, $I_m$ (critical gate current) versus $I_c$, is a $|\sin x/x|$ curve and appears as curve 10 in FIG. 1. Th gain curve may be compressed or expanded along either axis by tailoring the junction.

The maximum zero field critical current, $I_m(0)$, is given by:

$$I_m(0)=j\cdot A, \qquad (1)$$

where $j$ is the Josephson current density in supercurrent per unit area, and A is the area of the junction. In the case of FIG. 2 the area equals W × L, Thus the junction can be tailored to raise or lower the gain curve by varying W or L or both.

Also, with the control line 26 placed over the junction to provide a control current $I_c$ along the axis of gate current $I_g$, the field produced is given by:

$$H\alpha(I_c/W) \qquad (2)$$

The junction can be tailored to compress or expand the gain curve of $I_m$ versus $I_c$ by varying the width to length ratio of the junction.

An example of the carry gate comprising a rectangular Josephson junction is shown in FIG. 3, with a schematic diagram of FIG. 3 shown in FIG. 4. The carry gate comprises superconducting paths 32, 34, 36, 38, 40 and 42, tunnelling oxide 52 separating a rectangular area of superconductors 40 and 42, a resistance 50 and superconducting control lines 44, 46 and 48 overlaying and insulated from the junction 30. The junction 30 is formed by superconductors 40, 42 and tunnelling oxide 52. A superconducting ground plane, not shown, is provided and separated from the superconductors 32–42 by an insulating layer, not shown. Superconductor 36 and 38 each form a transmission line with the ground plane having characteristic impedance $Z_o$. To prevent reflection the current path comprising superconductors 36 and 38 is terminated in the characteristic impedance $2Z_o$.

The operation may be understood by referring to FIGS. 1 and 3. A gating current $I_{g2}$ is applied by a source connected to superconductors 32 and 34. When inputs $A_1$, $B_1$ and $C_o$ are all binary zero, no current is applied to control lines 44, 46 and 48, and the critical gate current is $I_m(0)$, which is greater than $I_{g2}$. Josephson junction 30 will be in the $v=0$ state and no current will flow in the alternate path comprising superconductors 36 and 38, and impedance 50.

A binary 1 at any input results in a control current $I_x$ on the corresponding control line. If only one of the inputs is a binary 1, the gain curve will be above $I_{g2}$ and no current will pass through impedance 50. The two logic conditions described thus far result in no current output corresponding to a carry $C_1$ output of binary 0. If two or three of the inputs are binary 1, the total control current will be $2I_x$ or $3I_x$, and as seen by FIG. 1, under both conditions the gain curve will be exceeded by $I_{g2}$. The Josephson device 30 will switch to $v=2\Delta$ causing an output current $2\Delta/2Z_o$. The device may be constructed by known techniques to provide $2\Delta/2Z_o=I_x$ so that the current in the alternate path may be used as the carry input to the succeeding stage of the adder.

Before applying a new binary input combination to the three input lines 44, 46 and 48, the gate current is reduced to zero, to "reset" the Josephson device to $v=0$ state. Furthermore, the input currents on lines 44, 46 and 48 are applied prior to applying the gating current $I_{g2}$. This is also followed in the sum gate to be described below. However, it should be noted that while it is important in the sum gate that the control currents be applied prior to the gating current, the order of applying currents to the carry gate is not important.

Figure 11:
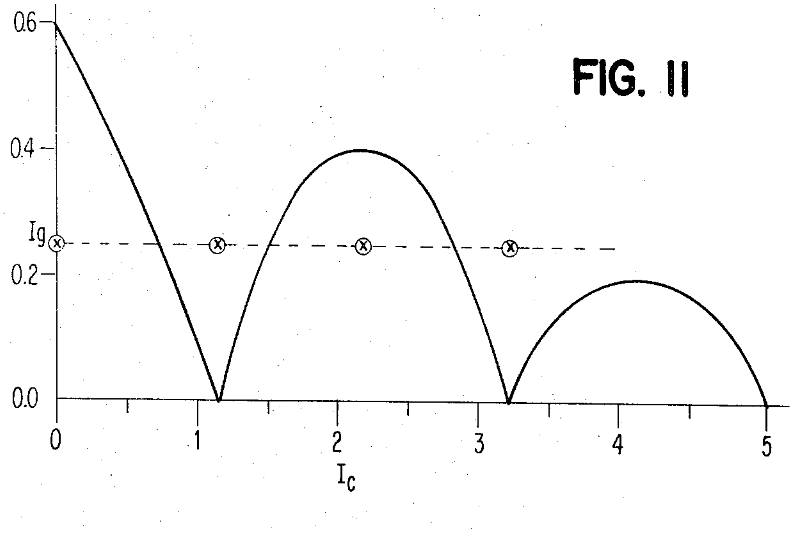
FIG. 11 is a graph of a gain curve for a particular H-shaped Josephson junction.

The sum gate, unlike the carry gate, must provide a binary 1 output when there is a single binary 1 input or three binary 1 inputs and must provide a binary 0 output when there are no binary 1 inputs or two binary 1 inputs. A $|\sin x/x|$ curve will not suffice and therefore a rectangular Josephson junction as shown in FIG. 11 will not suffice.

Figure 5:
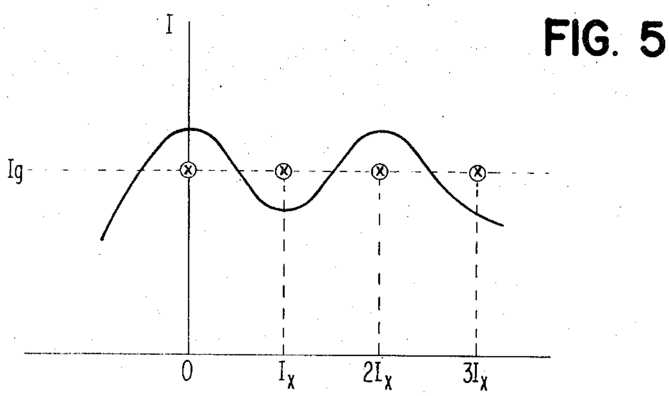
FIG. 5 is a graph of a gain curve for a Josephson device suitable for performing the sum function of a binary adder.

A generalized example of a gain curve needed to perform the sum gating infunction is illustrated in FIG. 5. The gain curve may be defined as a gain curve which exceeds a given gate current $I_g$ for control currents of 0 and $2I_x$ and which is exceeded by said gate current $I_g$ for control currents of $I_x$ and $3I_x$.

Figure 6:
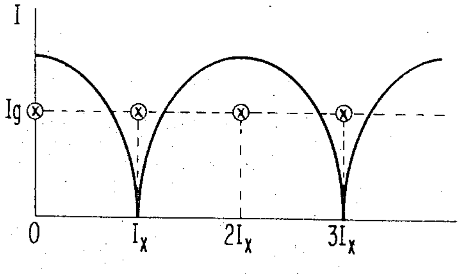
FIG. 6 is a graph of a gain curve for a two point junction quantum interference device.

A Josephson device with a gain curve as defined above will operate as a sum gate. One such Josephson device which has a suitable gain curve is a quantum interference device. A cryogenic device having two point junctions produces the quantum interference effect and has a gain curve such as shown in FIG. 6. It can be seen that the gain curve of FIG. 6 meets the requirements of the sum gate because it exceeds $I_g$ for control currents of zero and $2I_x$ and is below $I_g$ for control currents of $I_x$ and $3I_x$. In practice point junctions do not exist. Instead a fabricated device will have junctions of finite dimensions such as is shown in FIG. 7.

Figure 7:
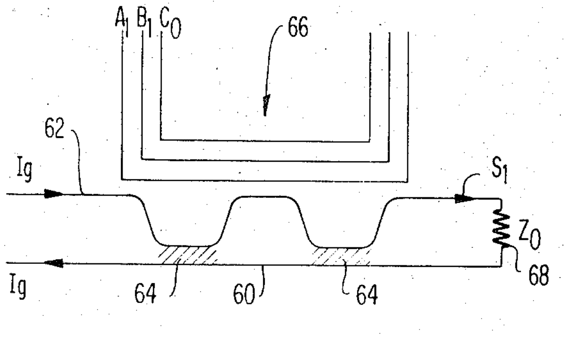
FIG. 7 illustrates an example of a Josephson device having the quantum interference effect.

The device of FIG. 7 is a Josephson device having the quantum interference effect. It comprises a first superconductor 60, a second superconductor 62, tunnelling oxide 64 and terminating resistor 68. The superconductors and the tunnelling oxide form two Josephson junctions. Three control lines 66 would be positioned to overlay the junctions. As in the case of the rectangular single Josephson junction described above, the device of FIG. 7 will switch $v=0$ to $v \neq 0$ when the control current causes the gain curve to drop below the subsequently applied gate current $I_g$. Although the practical device of FIG. 7 will not have the identical gain curve of a two point junction device (gain curve shown in FIG. 6), its gain curve will be somewhere between the gain curve of FIG. 6 and a | sin $x/x$ | curve. The gain curve of the device shown in FIG. 7 will satisfy the requirements of the sum gate.

Figure 8:
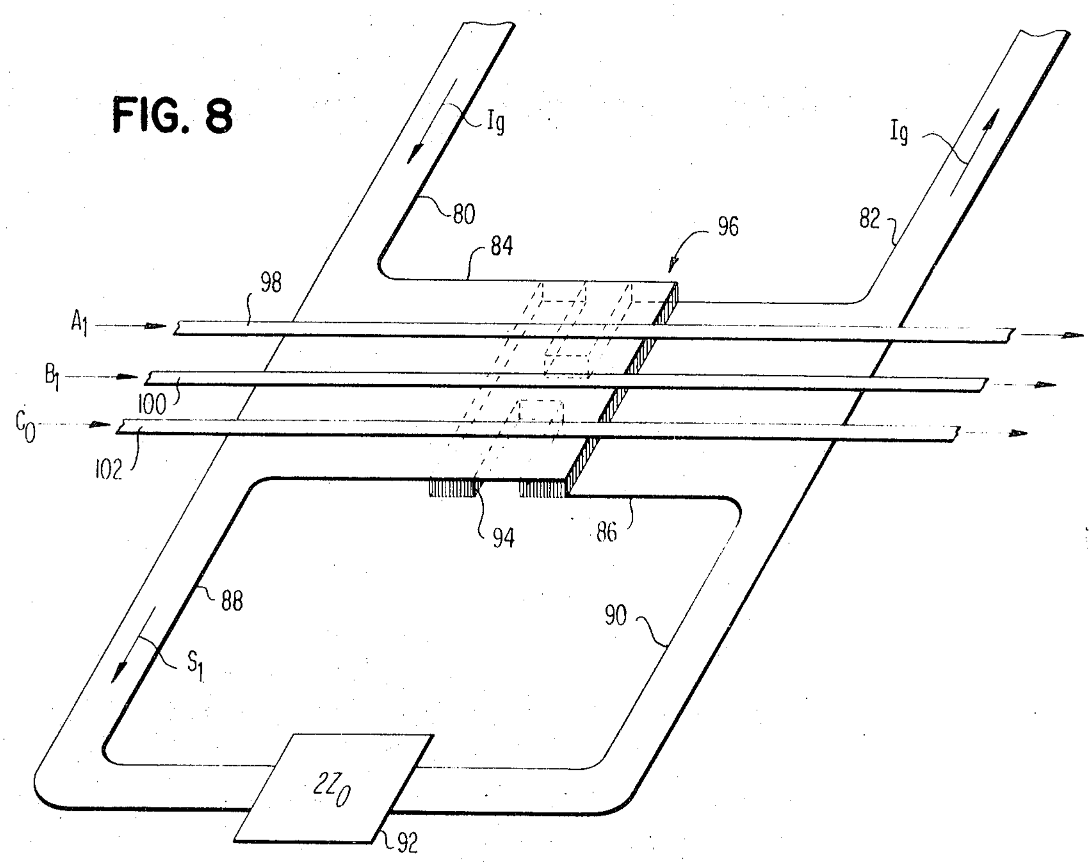
FIG. 8 is an oblique view of a sum gate comprising an H-shaped Josephson junction.
Figure 9:
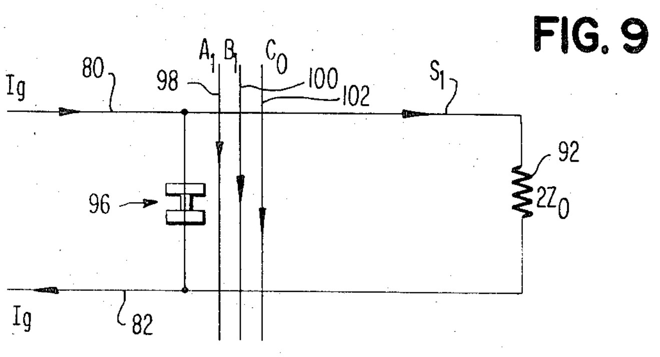
FIG. 9 is a schematic of FIG. 8.

A preferred embodiment of the sum gate uses a Josephson junction shaped like the upper case letter H, and is illustrated in FIG. 8. The H-shaped junction has a desirable gain curve which enables it to be used as a sum gate. A schematic of the gate of FIG. 8 is illustrated in FIG. 9.

The gate includes a superconducting ground plane (not shown) and an insulating material (not shown) covering the ground plane. The elements illustrated in FIG. 8 lie on the insulating material as in the case of the carry gate of FIG. 3. The gate further comprises an H-shaped Josephson junction 96 formed by superconductors 84 and 86 and tunnelling oxide 94, superconductors 80, 82, 88 and 90, terminating impedance 92, and control current superconductors 98, 100 and 102. The portion of the superconductors 84 and 86 which are separated by the tunnelling oxide 94 has the aforementioned H-shape and therefore the junction 96 has the H-shape.

The junction has the desired gain curve. When none or two of the inputs are binary 1, corresponding to total current of zero or $2I_x$, the gain curve exceeds $I_g$ and the junction voltage is $v=0$. When one or three of the inputs are binary 1, corresponding to total control current of $I_x$ or $3I_x$, the gain curve is exceeded by $I_g$ and the voltage across the junction is $v=2\Delta$. A current of $2\Delta/2Z_0$ flows in the alternate path including impedance $2Z_0$ and superconductors 88 and 90.

Figure 10:
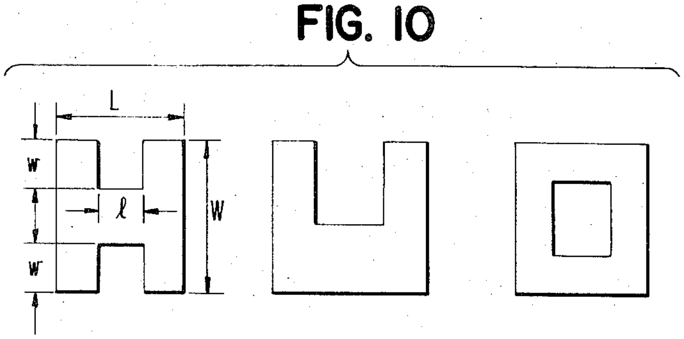
FIG. 10 illustrates some of the various shapes of Josephson junctions which may be used in the gate of FIG. 8.

Junctions having a shape different than the H-shape will also suffice. Three suitable junction shapes, including the H-shape are illustrated in FIG. 10. The H-shape is preferred because it it less subject to misregistration errors in fabrication. The O-shape is least preferred because it may trap flux.

The junction of FIG. 8, whether it is H-shaped, U-shaped, or O-shaped, also satisfies equations (1) and (2) above. Consequently, the gain curve can be compressed or expanded along the $x$ and $y$ axis by tailoring the junction, i.e., changing the overall length or width or changing the dimension of the notches. The optimum tailoring can easily be determined without undue exerimentation. Referring to the dimension symbols on the H-shape of FIG. 10 an optimum cut out size for the H-shaped junction is $l/L=0.45$ and $w/W=0.75$. These relative dimensions for the H-shaped junction result in the gain curve shown in FIG. 11.

The curve of FIG. 11 is a plot of control current versus critical gate current, both normalized to $j \cdot WL$. If $I_x$ has the normalized value of one on the $x$-axis, and $I_g$ has the value shown in the dotted line, the satisfactory conditions for the sum gate are obtained.

Figure 12:
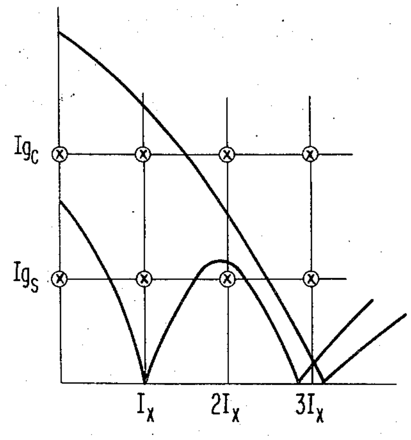
FIG. 12 illustrates the overlapping of gain curves for sum and carry gates using Josephson devices.

In the preferred embodiment of 1 the adder of the present invention, the sum and carry gates for a given stage receive the same three inputs in the form of control currents in control lines. Under these conditions the gain curves for the carry and sum Josephson devices should overlap in the manner indicated in FIG. 12. As explained above the devices can easily be tailored to shift the gain curves along either axis, and thus it is not a complex matter to tailor the devices so that the gain curves overlap as indicated.

A schematic diagram of a parallel binary adder is illustrated in FIG. 3. The short parallel lines crossing the conductor, as at 110, represents the Josephson device, such as the H-shaped junction, having the necessary gain curve to perform the sum function. The $x$ symbol, as at 112, represents the Josephson device, such as the rectangular junction, having the necessary gain curve to perform the carry function. The drawing shows a three stage parallel adder for adding binary words A and B, each of three-bit length.

Stage 0 has inputs $A_o$ and $B_o$ applied as control currents to the Josephson devices. All subsequent stages, e.g., stage $n$ have inputs $A_n$, $B_n$ and $C_{n-1}$. Input $C_{n-1}$ is the carry output from the preceeding stage. $S_n$ and $C_n$ represent the sum and carry output bits, in the form of currents, from the $n$ stage of the adder. It will be apparent that more than three stages could be included in the parallel adder.

In order to prevent any stage subsequent to the zero stage from switching prior to the generation of the carry bit in the preceeding stage, the gate currents $I_{g1}$ through $I_{g6}$ have to be started in a sequence. For example, at the start of the add operation, $I_{g1}$ and $I_{g2}$ would be gated on; a short time thereafter $I_{g3}$ and $I_{g4}$ would be gated on; etc.

The currents thru the respective impedances represent the sum and carry bits. In practice the sum bits, and the last carry bits, if so desired, would be applied as inputs to a sum register.

Figure 13:
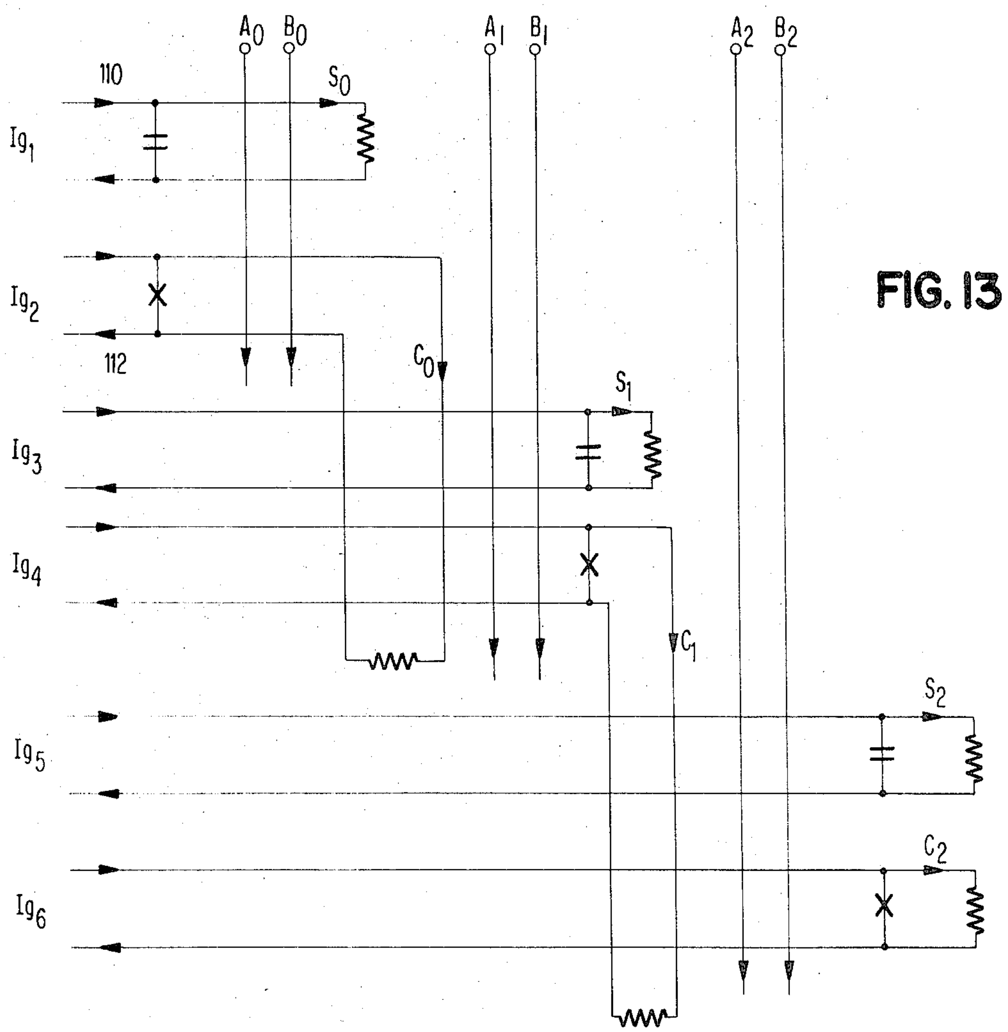
FIG. 13 is a schematic of a parallel binary adder using Josephson devices.

A single stage adder for adding two binary bits and generating sum and carry bits would be the same as the zero stage of the parallel adder shown in FIG. 13.

What is claimed is:

1. A binary adder comprising,

*a.* a first Josephson device for switching from the $v=0$ to the $v=2\Delta$ state when a gating current applied thereto exceeds a critical gating current,

*b.* means for applying a first gating current $I_{g1}$ to said first Josephson device,

*c.* a second Josephson device for switching from the $v=0$ to the $v=2\Delta$ state when a gating current applied thereto exceeds a critical gating current,

*d.* means for applying a second gating current $I_{g2}$ to said second Josephson device,

*e.* first and second control current means overlaying said first and second Josephson devices for carrying control currents along the same axis as said gating currents for varying the magnetic field of said Josephson devices, wherein the presence and absence of a control current $I_x$ in any said control current means corresponds respectively to first and second binary values,

*f.* said first Josephson device having a gain curve of critical current versus control current which exceeds $I_{g1}$ for total control currents of zero and $2I_x$ and which is below $I_{g1}$ for total control currents of $I_x$ and $3I_x$, and

*g.* said second Josephson device having a gain curve of critical current versus control current which exceeds $I_{g2}$ for total control currents of zero and $I_x$ and which is below $I_{g2}$ for total control currents of $2I_x$ and $3I_x$.

2. A binary adder as claimed in claim 1 wherein said adder further comprises, a. a first current conducting path, having an impedance $R_1$ therein, in parallel with said Josephson device, wherein said path carries a current $2\Delta/R_1$ when said first Josephson device is in said $v = 2\Delta$ state, and b. a second current conducting path, having an impedance $R_2$ therein, in parallel with said second Josephson device, wherein said path carries a current $2\Delta/R$ when said second Josephson device is in said $v = 2\Delta$ state.

3. A binary adder as claimed in claim 2 wherein all the elements of claims 1 and 2 comprise one stage of said adder and wherein said adder further comprises additional stages identical to said one stage, each said stage having the second alternate path from said preceeding stage overlaying the Josephson devices of said stage in the same manner as said control current means, and wherein control current $I_x \approx 2\Delta/R_2$.

4. A binary adder as claimed in claim 2 wherein said second Josephson device is a rectangular Josephson junction formed by two superconductors separated by a tunnelling oxide.

5. A binary adder as claimed in claim 2 wherein said first Josephson device is an H-shaped Josephson junction formed by two superconductors separated by an H-shaped layer of tunnelling oxide.

6. A binary adder as in claim 5 wherein said second Josephson device is a rectangular Josephson junction formed by two superconductors separated by a rectangular layer of tunnelling oxide.

7. A binary adder as claimed in claim 3 wherein said second Josephson device is a rectangular Josephson junction formed by two superconductors separated by a tunnelling oxide.

8. A binary adder as claimed in claim 3 wherein said first Josephson device is an H-shaped Josephson junction formed by two superconductors separated by an H-shaped layer of tunnelling oxide.

9. A binary adder as in claim 8 wherein said second Josephson device is a rectangular Josephson junction formed by two superconductors separated by a rectangular layer of tunnelling oxide.

* * * * *

UNITED STATES PATENT OFFICE
CERTIFICATE OF CORRECTION

Patent No. 3,784,854 Dated January 8, 1974

Inventor(s) Dennis J. HERRELL

It is certified that error appears in the above-identified patent and that said Letters Patent are hereby corrected as shown below:

Column 1, line 58 - delete "overlapping" and insert -- overlaying --

Column 2, line 63 - after "provide" insert -- the necessary --

Column 3, line 46 - delete "$H \ll (I_c/W)$" and insert -- $H \ll I_c/W$ --

Column 4, line 39 - delete "Figure 11" and insert -- Figure 3 -- line 43 - delete "infunction" and insert -- function -- line 68 - after "switch" insert -- from --

Column 5, line 53 - delete "1/L" and insert -- $\ell$/L --

Signed and sealed this 21st day of May 1974.

(SEAL)
Attest:

EDWARD M.FLETCHER,JR.
Attesting Officer

C. MARSHALL DANN
Commissioner of Patents